(No Model.)
J. T. TATE.
INSECT TRAP.
No. 442,650. Patented Dec. 16, 1890.
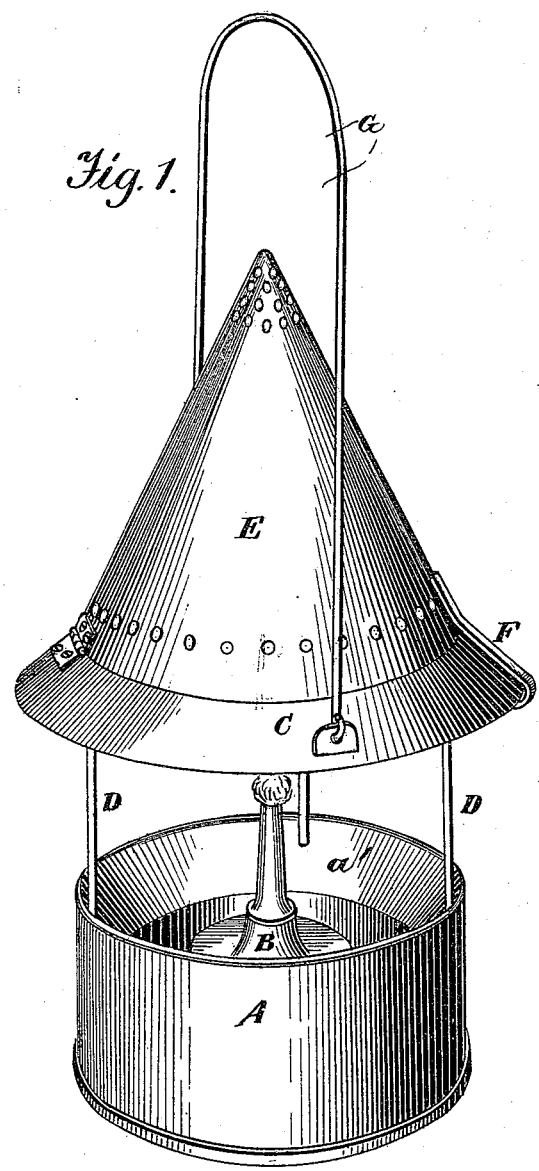
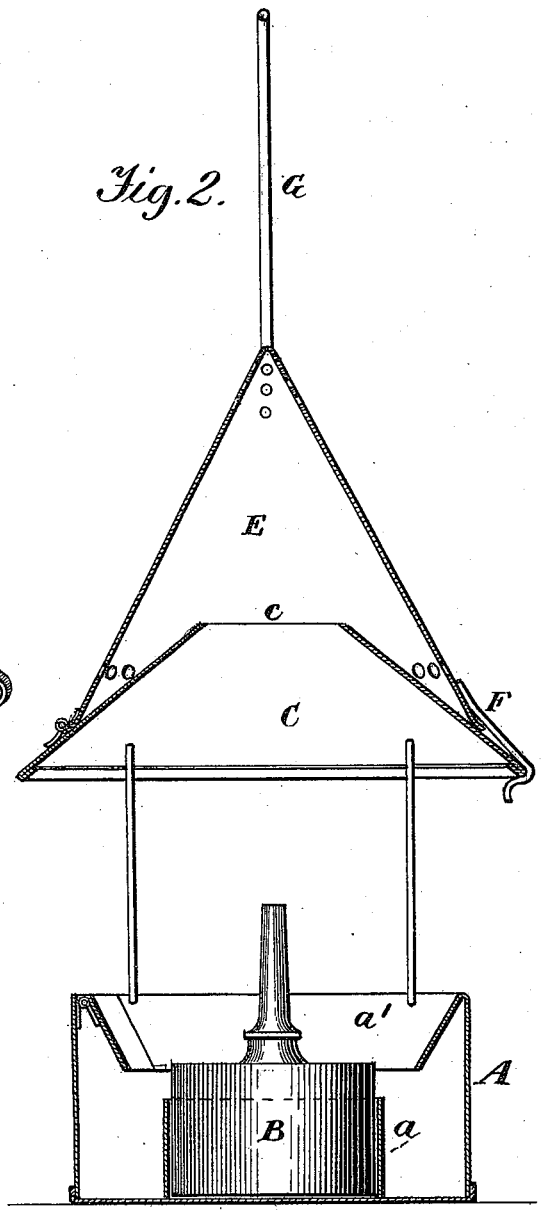
Witnesses.
A. Ruppert.
H. A. Daniels.
Inventor.
Jeddie J. Tate
Per
Thomas P. Simpson
Atty.

UNITED STATES PATENT OFFICE.

JESSIE TAYLOR TATE, OF WILLIAMSBURG, MISSOURI.

INSECT-TRAP.

SPECIFICATION forming part of Letters Patent No. 442,650, dated December 16, 1890.

Application filed August 1, 1890. Serial No. 360,665. (No model.)

*To all whom it may concern:*

Be it known that I, JESSIE TAYLOR TATE, a citizen of the United States, residing at Williamsburg, in the county of Callaway and State of Missouri, have invented certain new and useful Improvements in Moth-Traps; and I do hereby declare the following to be a full, clear, and exact description of the invention, such as will enable others skilled in the art to which it appertains to make and use the same.

The special object of the invention is to make a night-trap for catching moths and other winged insects.

The invention consists of a water-tank containing a lamp in the center thereof, a conical canopy supported on pillars attached to the upper edge of tank and provided with a central opening for the outlet of smoke from the light, and a conical cover perforated at or near the top and hinged to the canopy, also a wire bail by which the whole can be carried about like a water-bucket.

Figure 1 of the drawings is a perspective view, and Fig. 2 a central vertical section.

In the drawings, A represents the water-tank, which has a circular upward flange $a$, which surrounds the lamp B, while the water is between this flange and the side of the tank. The top edge of the tank is turned down inwardly to form the inclined flange $a'$. When the moths or other insects are attracted by the light and are so affected by the light as to fall down and strike this flange $a'$, they are quickly precipitated into the water and cannot crawl out of the tank.

C is a canopy convexed upwardly in a conical form, centrally open at $c$, and resting upon the pillars D, whose lower ends are secured to the upper edge of the tank A. It is preferably made diametrically larger than the tank, so as to spread out on all sides over and beyond its edge.

To the outside of the canopy I hinge the conical cover E, which is perforated at top to allow the escape of the smoke from lamp; but the perforations are not large enough for the insects to pass through. The lower edge of the cover is held down to the outside surface of the canopy by a spring-catch F, so as to form a joint sufficiently close to prevent the escape of the insects which pass up through the smoke-hole of the canopy. Thus it will be seen that the insects which rise as well as those which fall are effectually caught.

Having thus described all that is necessary to a full understanding of my invention, what I claim as new, and desire to protect by Letters Patent, is—

In an insect-trap, the canopy C, combined with a superposed hinged cover E, secured in front by a spring-latch F, and a subjacent tank A, having bottom central flange $a$ and inclined top flange $a'$, the parts A E being rigidly connected by rods, as shown and described.

In testimony whereof I affix my signature in presence of two witnesses.

JESSIE TAYLOR TATE.

Witnesses:
 THOS. MCLAUGHLIN,
 J. J. BOLTON.